United States Patent [19]

Caris et al.

[11] Patent Number: 5,039,425

[45] Date of Patent: Aug. 13, 1991

[54] PURIFICATION OF COMPRESSED AIR DISCHARGE CONDENSATE

[75] Inventors: John R. Caris, Wilmington; Robert M. Schwarz, Newark, both of Del.

[73] Assignee: Deltech Engineering, L.P., New Castle, Del.

[21] Appl. No.: 463,444

[22] Filed: Jan. 11, 1990

[51] Int. Cl.⁵ .......................... C02F 1/40; B01D 17/04
[52] U.S. Cl. ..................................... 210/691; 210/708; 210/718; 210/776; 210/788; 210/799; 210/DIG. 5; 55/52
[58] Field of Search ............... 210/691, 703, 708, 709, 210/718, 741, 776, 788, 799, 804, DIG. 5; 55/1, 52

[56] References Cited

U.S. PATENT DOCUMENTS

| Re. 20,227 | 1/1937 | Gordon | 210/188 |
|---|---|---|---|
| 748,981 | 1/1904 | Oliver | 210/540 |
| 1,702,612 | 12/1926 | Morse | 210/519 |
| 2,010,435 | 8/1935 | Matheson | 210/788 |
| 2,782,929 | 8/1954 | Colket | 210/540 |
| 3,358,838 | 12/1967 | Hosar et al. | 210/776 |
| 3,450,632 | 6/1969 | Olson et al. | 210/799 |
| 3,471,401 | 10/1969 | Huval | 210/799 |
| 3,558,482 | 1/1971 | De Young | 210/708 |
| 3,804,252 | 4/1974 | Rishel | 210/532.1 |
| 3,844,743 | 10/1974 | Jones | 210/DIG. 5 |
| 4,201,665 | 5/1980 | Savage et al. | 210/691 |
| 4,203,843 | 5/1980 | Carlstedt | 210/DIG. 5 |
| 4,424,068 | 1/1984 | McMillan | 55/52 |
| 4,684,467 | 8/1987 | Cloud | 210/540 |
| 4,888,117 | 12/1989 | Brown et al. | 210/DIG. 5 |

FOREIGN PATENT DOCUMENTS

| 184691 | 6/1986 | European Pat. Off. |
| 56-15931 | 4/1981 | Japan . |

OTHER PUBLICATIONS

Deltech Engineering Bulletin 750 Revision C entitled "Hydroclean Oil-Water Separators for Compressed Air Systems".
Serfilco Ltd., product bulletin 0-301A entitled "Oil Separation System—Coalescing", May 1987.
Beko Ltd. product bulletin entitled "Efficient oil/water separation from oil-contaminated compressed air Condensate".
Fast Systems Inc. entitled "Oil/Water Separator Complete Package Systems", Sep., 1987.

Primary Examiner—Stanley S. Silverman
Assistant Examiner—Christopher Upton
Attorney, Agent, or Firm—Connolly & Hutz

[57] ABSTRACT

A process for separating emulsified, suspended and separate oil as well as other contaminants from the water phase of a compressed air system condensate comprises the steps of discharging air and condensate from a compressed air system into a water filled separation tank where air is separated from the condensate. Some of the contaminants heavier than water are allowed to settle to the bottom of the separation tank while lighter oil contaminants are allowed to float to the surface where they are removed. Water and the remaining contaminants which did not flow to the surface or settle to the bottom of the tank are drained away until a given amount of liquid mass has been accumulated. Pressure applied to the liquid mass forces the mass into and through an underwater coalescing media. Such action causes substantially all of the remaining oil constituents to coalesce and thereby form a floating oil phase while other contaminants are retained by the coalescing media. The floating oil phase is removed and the remaining water is relatively pure.

6 Claims, 3 Drawing Sheets

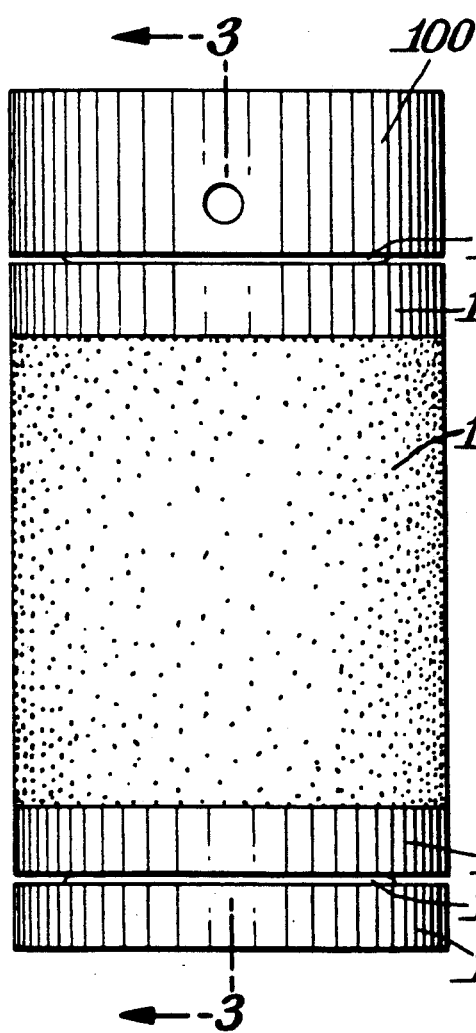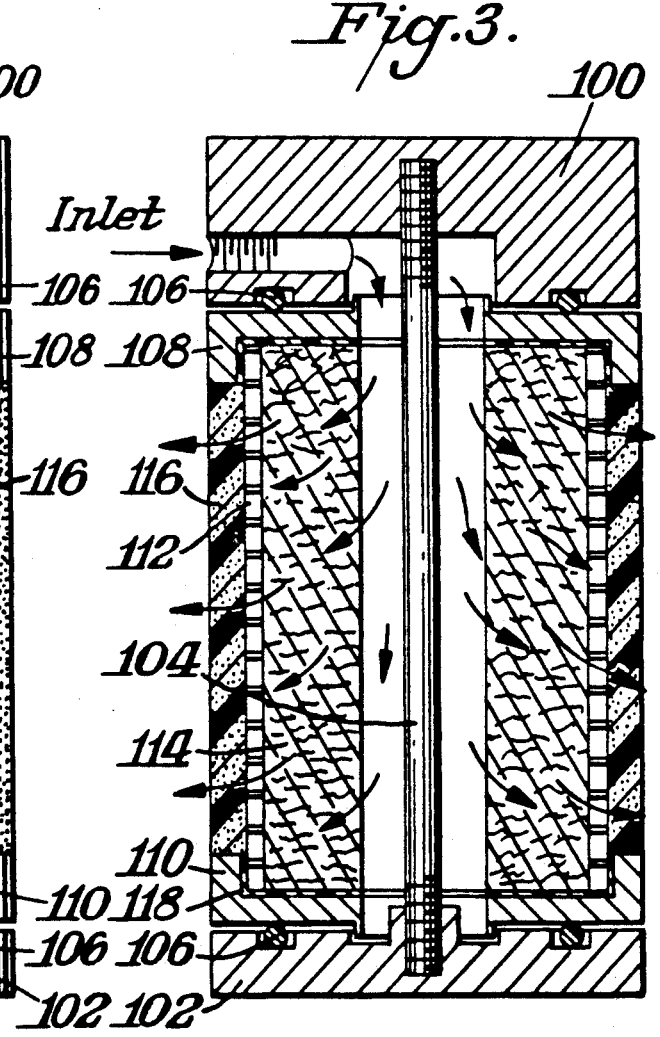

PURIFICATION OF COMPRESSED AIR DISCHARGE CONDENSATE

BACKGROUND OF THE INVENTION

The present invention relates to the purification of compressed air discharge condensate containing water, oil, dirt and scale. Typically such condensates include a high percentage of water having emulsified and suspended oil therein, a small percentage of separate oil and varying amounts of dirt, scale and the like.

The suspension and emulsification of oil and water found in compressed air system condensate is more severe than in other typical oil contaminated water cases, such as oil spills, industrial processes and general oil-water mixtures. The reason for this are primarily due to the compressed air system itself. In all air compressors oil is directly or indirectly mixed with air being compressed, and the oil is therefore subjected to the intense action of the compression process. The large amount of heat generated by compression and the inherent shearing action cause the oil to vaporize or break down into extremely small particles. Oil, therefore, leaves the compressor as a vapor, mist or droplet and is carried along with the water vapor and liquid also produced by compression in the air stream.

Because of condensation and turbulence, the oil and water are mixed throughout the system thereby creating finely emulsified and suspended oil-water condensate. This oil and water condensate is further mixed when removed from the air system through drain valves which let down both the condensate and compressed air from system to atmospheric pressure. Previous problems are often compounded by the use of compressor lubricants that easily emulsify or contain detergent additives.

Currently a large percentage of compressed air users discard compressed air discharge condensate directly into sewers and storm drains even though there are laws and regulations prohibiting this practice. Many state environmental health organizations are becoming increasingly more active in monitoring and enforcing all regulations governing oil concentrations in waste water. Hence, many compressed air users are obligated to process their condensate on-site or collect it and use off-site processing facilities which can be very expensive.

Prior art oil-water separation equipment and methods are voluminous. Most pertain to oil spills, off shore clean up, shipping and oil field applications where the specific gravity difference between the oil and water is 0.09 or greater. Few are intended for the purification of compressed air system condensate where the specific gravity difference may be lower than 0.01.

Currently the system discharge is subjected to various processes such as gravity separation, coagulating chemicals, ultra-filtration, parallel plate coalescers, carbon adsorption, absorbing media, surface skimmers etc. However, these methods of separation do not effectively purify condensate and they are incapable of dealing with all the various constituents of the condensate. For example, gravity separators, parallel plate coalescers, absorbing media and surface skimmers cannot remove emulsified and suspended oil in water (which can be a large percentage of the oil in a condensate). Coagulating chemicals, ultra-filtration and carbon adsorption cannot deal with gross oil and heavy particulates in the process water.

Other factors also make purifiers impractical, such as size requirements, flow capacities, processing costs and large amounts of human intervention. There are also special requirements of compressed air system condensate purifiers such as being able to handle the large amount of compressed air which is discharged along with the condensate and material compatibility with synthetic compressor lubricants.

SUMMARY OF THE INVENTION

Accordingly, there is a definite need for a compressed air system condensate purifying process which can handle high pressure air along with the condensate, remove particulate contaminants such as dirt and scale, remove gross oil contamination as well as fine oil suspensions and emulsions, collect and hold oil while allowing water to discharge to drain, and process varying amounts of condensate at a cost which makes it more desirable than off-site processing.

In accordance with the present invention, a process is provided for separating emulsified, suspended and separate oil as well as other contaminants such as dirt, scale rust and the like from the water of a compressed air system condensate. This process primarily comprises the steps of discharging air and condensate from a compressed air system into a water filled separation tank where air is separated from the condensate. The contaminants heavier than water are allowed to settle to the bottom of the separation tank while the lighter oil contaminants float to the surface of the tank where they are removed. The water and remaining contaminants which did not float to the surface or settle to the bottom of the tank are drained away until a given amount has been accumulated. Pressure applied to the accumulated water and contaminants forces this liquid mass into and through an underwater coalescing media. The remaining oil constituents coalesce to form a floating oil phase while other contaminants are retained by the coalescing media. The floating oil phase can then be removed to thereby produce relatively pure water.

BRIEF DESCRIPTION OF THE DRAWING

Novel features and advantages of the present invention in addition to those mentioned above will become apparent to those of ordinary skill in the art from a reading of the following detailed description in conjunction with the accompanying drawing wherein similar reference characters refer to similar parts and in which:

FIG. 2 is a side elevational view of one of the two coalescers of the system shown in FIGS. 1A and 1B; and FIG. 3 is a sectional view taken along line 3—3 of FIG. 2.

DETAILED DESCRIPTION OF THE INVENTION

Figure 1A:
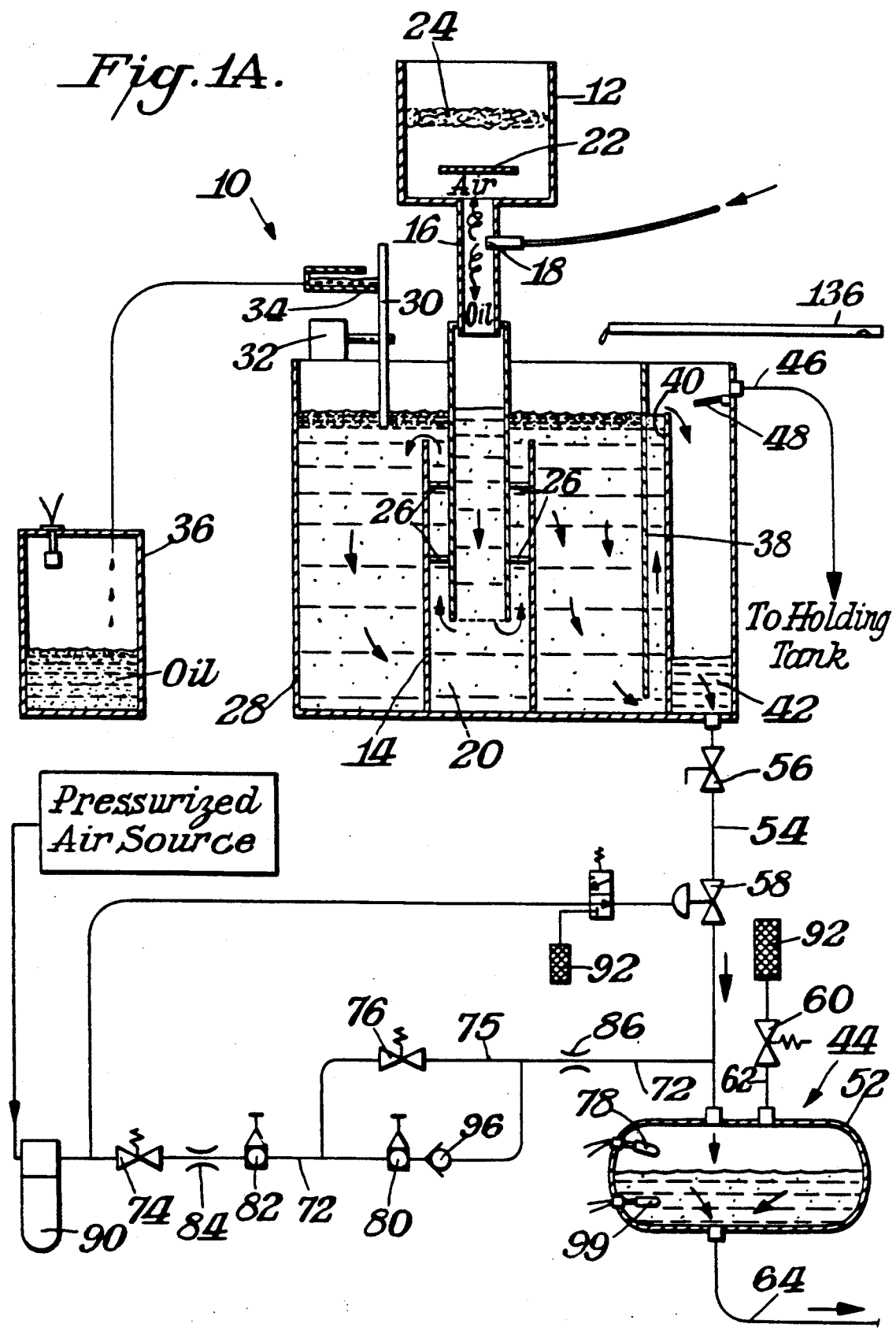
FIG. 1A is a schematic view of a system for purifying compressed air discharge condensate, illustrating the initial stages of the system, according to the present invention.
Figure 1B:
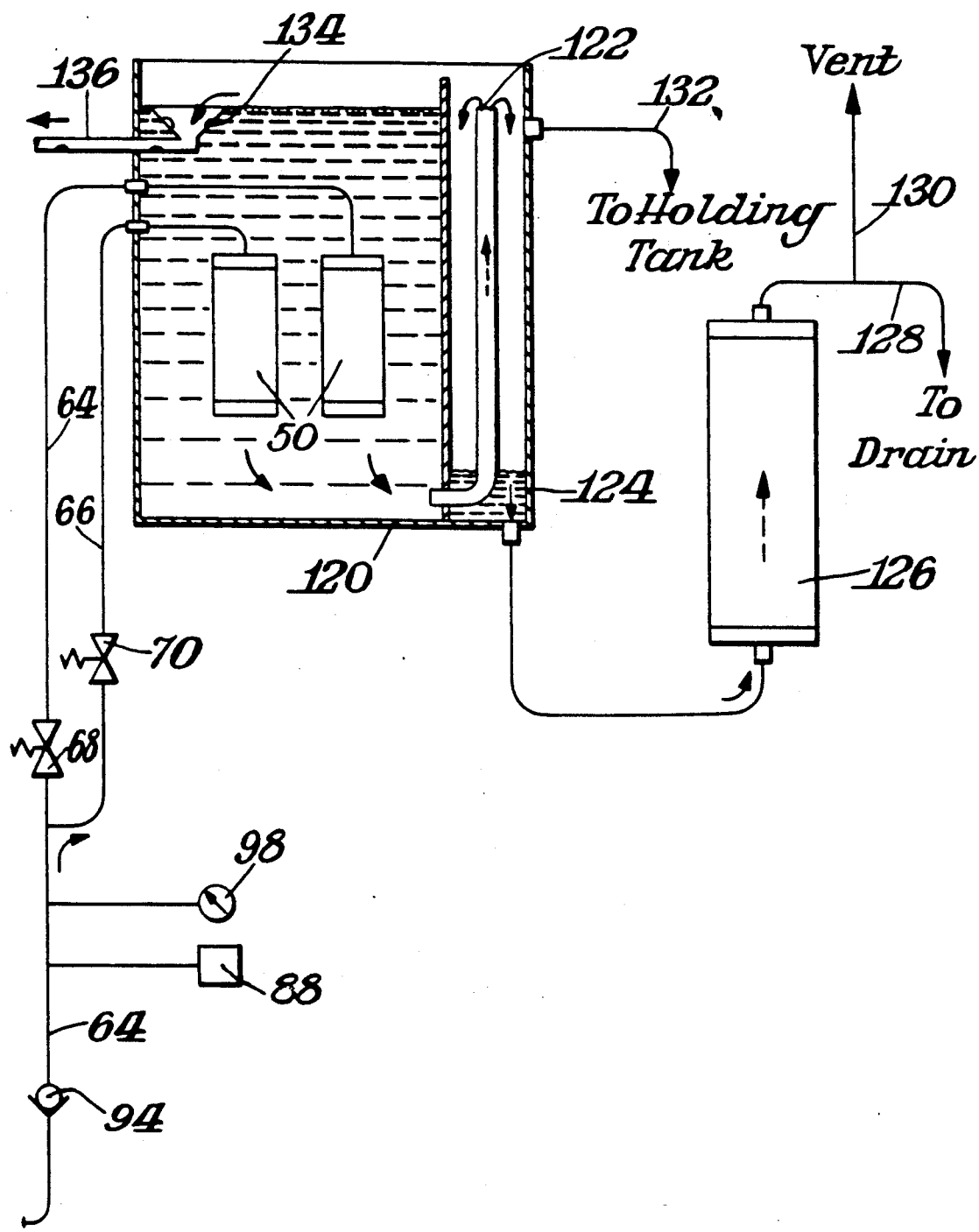
FIG. 1B is a schematic view of the remaining stages of the system shown in FIG. 1A.

Referring in more particularity to the drawings, FIGS. 1A and 1B illustrate a purification system 10 wherein compressed air condensate containing oil, water, air, dust and scale is processed. The system includes a decompression chamber 12 connected to a sedimentation separator 14 by a vertical pipe 16. Condensate to be processed flows through a feed inlet 18 positioned off center in the vertical pipe to thereby impart a centrifugal force to the incoming condensate. The spinning action of the centrifugal force serves two functions. First, the centrifugal action helps the gross oil separate from the water, and second, it allows the heavier oil and water to spin in a downward direction while the air spins in an upward direction. This minimizes liquid carryover into and out of the decompression chamber 12 and eliminates air from blowing down into the sedimentation separator 14 where it might otherwise disturb the liquid in a quiet zone 20 in the separator. This is especially important when large amounts of air accompany the incoming condensate.

As air exits from the top of the decompression chamber 12 its path is diverted by a baffle plate 22 and/or a demister pad 24 which may be stainless steel, aluminum or thermal plastic wire mesh. This ensures that no condensate is passed along with the air being discharged from the decompression chamber.

Oil, water, dirt and scale travel down the pipe 16 into the sedimentation separator 14. All heavier than water particulates in the condensate such as dirt, rust and scale settle in the bottom of this separator. Such settling is ensured by sizing the process liquid passageways large enough so that no particles are entrained or swept along with the moving fluid. The quiet zone 20 is an area at the bottom of the sedimentation separator where dirt and scale may build up without being affected by the flow. Preferably, the sedimentation separator 14 is designed so it may be easily removed and cleaned when required.

Oil, water and small suspended particulates then travel up through a series of baffles 26 in the sedimentation separator 14 which aid in the coalescing of large oil particles into a settling tank 28. Gross oil and oil/water mixtures which are less dense than water gravitate to the surface where the oil is removed. While there are many methods for removing oil from the surface of water, in one particularly useful method a wheel 30 made of polypropylene is driven by a motor 32. The wheel spins through the surface of the liquid and picks up oil which is then scraped from the wheel surface by flexible scrapers 34. The removed oil drains into a waste oil recepticle 36.

As shown in FIG. 1A, the flow slowly moves in a downward direction through the settling tank 28. The tank is sized so that the process liquid has a long enough residence time in the tank whereby the non-emulsified and suspended oil may rise to the surface due to the Stokes Law Principle. The process liquid which now only contains water, finely emulsified and suspended oil and dirt exits the bottom of settling tank 28 through a baffle 38 and over a weir 40 into a holding zone 42. Weir 40 establishes the level in the tank. The holding zone retains the process liquid while a pressure pusher system 44 is functioning, as explained more fully below. Moreover, the holding zone is designed to hold the amount of process liquid which would pass through the settling tank 28 during the longest complete cycle of the pressure pusher system.

An overflow outlet 46 is provided in the holding zone 42 in the event there is a problem with the downstream portion of the purifier. The overflow liquid could then be piped to a holding tank (not shown) for storage until the problem is corrected. The overflow is then processed back through the separator in batch loads. A float switch 48 is also incorporated in the holding zone 42 for activating an alarm when the level in the holding zone reaches a critical level. From the holding zone 42, the process liquid is gravity fed into pressure pusher vessel system 44.

The primary function of the pressure pusher system 44 is to supply the mechanical energy required to force the process liquid through one or more coalescing elements 50. This pressure pusher process is different from current processes where gravity or pumps are used to supply process liquid to a coalescer. Gravity coalescing systems cannot supply the necessary force or pressure which is required by a coalescing element capable of efficiently handling emulsified and finely suspended oil. While pumps are capable of supplying the required pressure, the fluid shearing action inherent with the pumping process further emulsifies the oil particles into smaller diameters which reduces the coalescer element efficiency. A pump system also creates a problem of controlling the pressure to the element. High pressures cause severe stress on the element which can cause element destruction. Reducing pump pressure can only reasonably be done with an internal relief or bypass. This means that the fluid may be pumped in a loop many times before it is actually sent to the coalescer. This compounds the shearing action problem discussed above.

The pressure pusher system 44 of the present invention functions to supply process liquid to the coalescing element 50 in a manner that does not further emulsify the liquid. Also, the system is regulated to supply a desired consistent force or pressure to move the process liquid to the coalescing element 50. The pressure pusher system operates in two modes, one being a filling mode and the other a pushing mode.

The filling mode is as follows. A pressure pusher vessel 52 is filled with process liquid draining from the holding zone 42 through a line 54 having a hand operated shut off valve 56 and a pneumatically operated valve 58 which is open in this mode. The purpose of the hand operated valve 56 is for convenience when servicing the system. The function of the pneumatic valve 58 is to either allow the process liquid to fill the pressure pusher vessel 52 or to stop the flow and seal the incoming line when a given amount of process liquid has been accumulated. Pneumatic valve 58 is best suited for this application because it does not restrict flow in the open position and is capable of holding back high pressures. Moreover, the valve is relatively small in size and economical.

When the pressure pusher vessel 52 is filling, a solenoid operated vent 60 connected to a line 62 at the top of the vessel is open. A line 64 extends from the bottom of vessel 52 to one of the two coalescing elements 50 while a branch line 66 is connected to the other element. Solenoid valves 68 and 70 in the lines 64 and 66, respectively, are closed when the pusher vessel 52 is filling which prevents any liquid from being discharged from the vessel 52 during the filling mode.

Air is supplied to the line 54 from an air supply line 72 having a solenoid controlled valve 74 therein. There is also a bypass line 75 connected to line 54, and a solenoid controlled valve 76 is located in the bypass. These later two valves are closed during filling of the vessel 52 with process liquid from the holding zone 42, and no air is introduced during the filling mode.

When the process liquid level in the pressure pusher vessel 52 reaches a predetermined height, an upper float switch 78 in the vessel electrically signals a control circuit (not shown) to switch into the pushing mode. At this point, pneumatically operated valve 58 is closed and vent valve 60 is also closed. The solenoid operated valve 74 in line 72 is opened along with one of the two coalescer line solenoid valves 68 or 70. When valve 74 opens, air enters the system at a pressure determined by the pressure settings of two regulators 80,82 in the line. Typical settings could be 10–15 psig for the first stage regulator 80 and 20–30 psig for the second stage regulator 82. This pressure is what pushes the process liquid to one of the two coalescing elements 50.

Two orifices 84, 86 are used in the control air line 72. The first orifice 84 located downstream from valve 74 prevents a pressure surge which might otherwise shock the regulators 80,82 when valve 74 is opened. A shock of this type can easily change settings and damage the regulators over a short period of time. The second orifice 86 functions to slowly raise the air pressure in the vessel 52 (about 3–10 seconds) so as to not to surge and shock the coalescing elements 50. Shocking the elements 50 can easily cause them to prematurely blow-out over time.

First and second staging of the control air is an important aspect of the preferred embodiment of the pressure pusher system 44. As a coalescing element 50 becomes loaded with oil, the pressure drop across the element is raised thus causing a build up of back pressure. A coalescing element eventually comes to equilibrium with the oil entering the element equal to the oil being discharged therefrom. As a result, the back pressure remains constant. However, when particulates are in the process liquid as is the case with compressed air condensate, the back pressure continually increases as the filter retains these particulates.

The staging process of the present invention allows the pushing pressure to increase as the back pressure on the element 50 increases therefore keeping a relatively constant driving force on the element. If the driving force is too high, process liquid moves to quickly through the element to be efficiently coalesced. Moreover, if the driving force is too low, the process liquid does not move at all.

Staging is accomplished by a pressure switch 88 in line 64 which when sensing an increase in back pressure opens the bypass solenoid valve 76. Before the pressure switch 88 is tripped, the incoming air pressure is reduced by the second stage regulator 82 to 30 psig, for example, and then it is reduced again by the first stage regulator 80 to 15 psig, for example. The driving pressure in the first stage of operation is then 15 psig.

The pressure switch 88 is set based on the flow characteristics of the coalescing element 50. For an estimate, this would be 10 psig, and when the back pressure reached 10 psig, the switch 88 would open the bypass solenoid 76. Then the incoming air would only be reduced by the second stage regulator 82 and the pressure in the vessel 52 would be raised to 30 psig.

For simplicity sake this staging process is only shown with two stages, although, any number of stages could be incorporated, or some other system based on variable pneumatic pressure could be used.

Other elements of the pressure pusher system 44 include a particulate filter 90 at the inlet of the air supply line 72 which prevents the solenoids, regulators and orifices from becoming blocked or contaminated with particulate material. Also, mufflers 92 are used on pressure vents for noise reduction and safety. A check valve 94 is used in the feed line 64 to the coalescers 50 because of the inherent inability of the solenoid valves to retain pressure in both directions which might otherwise cause the process liquid to slowly siphon back to the pressure pusher vessel 50 during the filling process. A check valve 96 is placed in line 72 after the first stage regulator 80 so air does not backflow out of the regulator when the bypass solenoid valve 76 is open. A back pressure gauge 98 in line 64 is used as an operator convenience to monitor the back pressure of the coalescing element. Also, a lower level float switch 99 in the vessel 52 signals when the pushing mode is completed, and the filling mode is then repeated.

As previously explained, the back pressure of the coalescer 50 continually increases, and correspondingly the driving force continually decreases. As the driving force continually decreases, the length of time it takes to process the accumulated volume of process liquid in the pressure pusher vessel 52 continually increases. If an element 50 was left in service long enough it would reach a point where it could not process liquid fast enough to keep up with the inlet condensate, thus causing a system failure. Therefore, a coalescing element has a definite service life and must not be used beyond that life. The problem is that there are so many factors that govern service life it is impossible to predict.

The controlling logic of the present system solves this problem by continuously monitoring the service life of each coalescer in operation, and automatically switches to the other coalescer in the system by opening and closing valve 68,70 when the end of service life is reached. The logic may also signal an operator which one of the coalescers 50 requires replacement. This function is performed by electronically timing the period it takes to push the process liquid volume from the pressure pusher vessel 52 during each pushing mode. The length of pushing time is calculated by equating the maximum allowable push time to the known pressure pusher vessel process volume divided by the maximum capacity (GPM) of the system.

If the electronic timer does not reach the determined push time setting during the push mode, the logic is reset for the next push mode. If the timer does reach the push time setting it signals the logic to switch the flow from one coalescing element to the other coalescer element, as well as lighting an indicator on a panel and activating an audible alarm to signal an operator. When the system switches to the alternate coalescer 50 it begins timing its push time the same as the previous coalescer.

The surface area of the coalescer should be sized to process the required amount of cycles under maximum rated conditions to provide an overall element life of at least a month, therefore giving an operator an ample amount of time to replace the expended element. This switching logic also makes the oil-water separator system a continuous process. This is especially important for compressed air users that leave compressors running over nights and weekends without operators to monitor the system. The system shown indicates only one coalescer element being used at a time, although, in larger applications any number of elements may be manifolded together to give the required surface area.

The function of the coalescing element 50 is to bring together the small suspended and emulsified oil particles into larger particles which will readily float in water.

Suspended dirt particles are also removed from the process liquid by being trapped in the element and coalesced oil. The nominal pore size rating of the coalescing element 50 is an important factor on how efficiently oil is coalesced. Larger pore elements produce lower pressure drops and therefore, require less driving force although they are not suitable for removing smaller suspended and emulsified oil particles. Smaller pore elements load-up quicker and produce larger pressure drops but are essential for coalescing the smaller oil particles sometimes encountered. Various compressed air systems and various types of oils used in them produce oil emulsions and suspensions of varying amounts and diameters. Therefore, it is important that a coalescing element has the proper pore size for the specific application. The present oil-water separator system can easily incorporate coalescing elements with pore sizes that range from 1 to 50 microns.

Details of each coalescing element assembly 50 are shown best in FIGS. 2 and 3 of the drawing. Element 50 is held and sealed by top and bottom end plates 100 and 102, a tie rod 104 and o-rings 106. The plates and tie rod are preferably made from non-corrosive materials, designed to withstand at least three times maximum pushing pressure. 0-rings 106 are made of elastomer material that holds up well to petroleum and synthetic lubricants. The element itself consists of a top cap 108 and a bottom cap 110, a support core 112, an inside element media 114, an outside foam sleeve 116 and potting compound 118.

The element media 114 may comprise water repellent fiberglass held together with a binder and formed into a tube. Tube diameter and wall thickness may vary for different air system applications although typical dimensions are 2 ½" O.D. with a ¾" wall thickness. Length is determined by flow rate and if the flow rate is very large, multiple elements may be used. Varying the pore size of the elements is achieved by altering the fiberglass fiber diameter, density, and amount of binder content.

The element tube is tightly fit inside the rigid support core 112 which provides the pressure retaining strength for the element media. The core may be made of physically strong non-corrosive material, and has sufficient open area so that it does not restrict flow. The foam sleeve 116 is stretched over the support core 112, and provides additional larger pore coalescing which makes oil droplets bigger. Increasing oil droplet diameter insures that oil droplets will quickly rise and not be entrained in post-coalesced process liquid.

The element media 114, support core 112, and foam sleeve 116 sub-assembly is potted or otherwise glued between the top and bottom caps 108,110 of the coalescing element 50. Potting compound 118 is an adhesive which bonds and seals the sub-assembly to the caps. Element 50 is then placed between the top and bottom plates 100,102. These plates are spun together on tie rod 104 tight enough to seal the o-rings 106 between the plates and caps, as shown. This design allows for replaceable elements to be easily changed using existing end plates, tie rod and o-rings.

There are many reasons why the present coalescer element 50 is superior to similar prior art structures. First, the element design does not require a housing and is capable of being directly placed in an open tank of water. Housings for coalescing filters that retain pressure and do not corrode can be costly, especially when systems are large or multiple coalescing elements are required. Also, when an element is in a housing, the coalesced oil must be piped along with the post coalesced process liquid out of the housing to some point where it may be separated. The velocities and turbulence associated with outlet piping would tend to break the larger coalesced droplets into smaller diameters therefore re-mixing the oil with the water and making separation more difficult or impossible.

In the present system, the element 50 directly sits in an open coalescing tank 120 where separation occurs, and the aforementioned problem does not exist. Velocities of the process liquid are so slow in the tank that coalesced oil is allowed to gently rise to the surface where it may be removed. Other benefits to this design include easier and quicker element change and elements which may be visually inspected while in service. Also, there is a large degree of flexibility in the size and number of elements that may be used. This is very important for compressed air system users that make changes in compressor size or lubricant after a system of this type is installed.

These and other features of the invention permit effective processing of compressed air condensate containing oil emulsions with a specific, gravity difference from water of well below 0.01. Many commercial oil-water separators are effective only when the specific gravity difference is 0.09 or greater.

The post-coalesced process liquid flows downward from the coalescing element assembly 50 in the coalescing tank 120. It is then ported up to and over a weir 122 which establishes the liquid level in the coalescing tank. The liquid is then retained in a holding zone 124 prior to flowing to an adsorption vessel 126. The adsorption vessel is the final section of the oil-water separator system 10. Its function is to remove or adsorb any extremely small oil particles not able to be coalesced. The amount of non-coalescable oil may be zero or at most a very small percentage of the oil removed by the system. Therefore, the adsorption vessel 126 is merely a polishing stage that ensures the oil concentration of the waste water leaving the system will meet the local and state regulations governing the compressed air user.

Process liquid flows from the holding zone 124 thru the adsorption vessel 126 by means of gravity. This along with a proper height location of the vessel makes it possible to keep the adsorption vessel 126 filled with liquid at all times. This is important from an adsorption standpoint because the longer the process liquid is in contact with the adsorption media the purer the discharge water will be. The volume of the adsorption vessel 126 is sized to give the required adsorption contact time necessary at the maximum system GPM rating. A typical adsorption vessel liquid volume would be equivalent to four times the process volume of the pressure pusher vessel 52. Flow through the adsorption vessel is upward, in order to keep liquid in the vessel until it is pushed out through a line 128. A vent 130 is incorporated in the line 128 at the top of the adsorption vessel 126. The purpose of the vent is to keep the processed liquid from being siphoned from the adsorption vessel.

An overflow 132 is incorporated at the top of the holding zone 124. The function of the overflow is to bypass the adsorption vessel 126 in the event that the adsorption media becomes loaded. This would happen if the adsorption media was not changed at one of the specified intervals.

Coalesced oil floating on the surface of the tank 120 simply spills into an oil drain 134 at the top of the tank and is conveyed away along line 136. The line can empty into the oil receptacle 36 or the settling tank if water is mixed with the removed oil.

System 10 is easily controlled and operated by any convenient means such as a microcomputer, for example. The specifics of any control system are well within the knowledge of those skilled in the art and details thereof are unnecessary.

What is claimed is:

1. A process for separating emulsified, suspended and separate oil as well as other contaminants such as dirt, scale, rust and the like from the water of a compressed air system condensate, the process comprising the steps of discharging air and condensate from a compressed air system into a water filled separation tank where air is separated from the condensate, allowing at least some of the contaminants heavier than water to settle to the bottom of the separation tank while at least some of the lighter oil contaminants are allowed to float to the surface of the tank, removing the floating oil contaminants from the surface of the separation tank, draining away from the separation tank at least a portion of the water and remaining contaminants which did not float to the surface or settle to the bottom of the tank and accumulating said drained water and contaminants in a pressure vessel until a given amount has been accumulated, applying compressed gas pressure to the accumulated water and contaminants in said pressure vessel, forcing the accumulated water and contaminants therein into and through a coalescing media by the compressed gas pressure applied thereto whereby substantially all of the remaining oil constituents coalesce to form a floating oil phase while other contaminants are retained by the media, and removing the floating oil phase.

2. A process as in claim 1 including the further steps of flowing the liquid discharge from the coalescing media through an adsorption media to remove any uncoalescable oil therefrom, and drawing water relatively free of contaminants from the adsorption media.

3. A process as in claim 1 wherein the floating oil contaminants on the surface of the separation tank are removed by a motor driven wheel rotating through the water and picking up the oil on the wheel surface, and removing the oil from the wheel surface by scraping.

4. A process as in claim 1 wherein centrifugal forces are imparted to the air and condensate discharged into the separation tank to assist in separating air and some oil from the condensate.

5. A process as in claim 1 including the steps of sensing the back pressure on the coalescing media as the accumulated water and contaminants are forced therethrough by the applied pressure, and increasing the applied pressure when the back pressure on the coalescing media exceeds a predetermined amount.

6. A process as in claim 1 wherein the coalescing media is operated at least partially under water.

* * * * *